US010468930B2

(12) United States Patent
Dawson et al.

(10) Patent No.: US 10,468,930 B2
(45) Date of Patent: Nov. 5, 2019

(54) SEGMENTED BRUSHLESS STATOR INTERCONNECT SYSTEM (71) Applicant: KOLLMORGEN CORPORATION, Radford, VA (US)

(72) Inventors: Scott Dawson, Radford, VA (US); Anthony Nozzi, Dublin, VA (US)

(73) Assignee: KOLLMORGEN CORPORATION, Radford, VA (US)

( * ) Notice: Subject to any disclaimer, the term of this patent is extended or adjusted under 35 U.S.C. 154(b) by 287 days.

(21) Appl. No.: 15/288,793

(22) Filed: Oct. 7, 2016

(65) Prior Publication Data

US 2017/0104378 A1    Apr. 13, 2017

Related U.S. Application Data (60) Provisional application No. 62/239,370, filed on Oct. 9, 2015.

(51) Int. Cl.
*H02K 3/28* (2006.01)
*H02K 3/52* (2006.01)
*H02K 3/34* (2006.01)
*H02K 15/00* (2006.01)
*H02K 15/06* (2006.01)

(52) U.S. Cl.
CPC ............. *H02K 3/28* (2013.01); *H02K 3/345* (2013.01); *H02K 15/0081* (2013.01); *H02K 15/065* (2013.01)

(58) Field of Classification Search
CPC .......... H02K 3/28; H02K 3/245; H02K 3/522; H02K 2203/03; H02K 15/0081

USPC ........................................................ 310/71
See application file for complete search history.

(56) References Cited

U.S. PATENT DOCUMENTS

| | | | |
|---|---|---|---|
| 6,941,638 B2 | 9/2005 | Hartsfield et al. | |
| 2005/0212377 A1* | 9/2005 | Wang | H02K 3/522 310/260 |
| 2013/0270945 A1 | 10/2013 | Ziegler et al. | |

(Continued)

FOREIGN PATENT DOCUMENTS

DE    20 2007 014169 U1    2/2008

OTHER PUBLICATIONS

Interplex Industries, Inc., Automotive Products, "Press-Fit Interconnect Technology", 2010. (7 pages).

(Continued)

*Primary Examiner* — Forrest M Phillips
(74) *Attorney, Agent, or Firm* — Day Pitney LLP (57) ABSTRACT

A stator of an electric motor is provided. The stator includes a plurality of segments, each of the segments including a tooth having a magnetically-permeable material, an electric coil surrounding the tooth, and at least one insulator. The stator also includes a plurality of connectors, each connector including first and second terminals, the first terminal adapted to be inserted into the at least one insulator and to couple to the electric coil of each of the plurality of segments and a circuit board coupled to input power lines and including apertures adapted to receive the second terminals of the plurality of connectors. The circuit board is coupled to the electric coils of each of the plurality of segments via when the second terminals are received in the apertures.

22 Claims, 7 Drawing Sheets

(56) References Cited

U.S. PATENT DOCUMENTS

| | | | | |
|---|---|---|---|---|
| 2015/0372560 A1* | 12/2015 | Liang | ............... | H02K 5/24 |
| | | | | 310/71 |
| 2016/0111929 A1* | 4/2016 | Kessler | ............... | H02K 3/28 |
| | | | | 310/71 |
| 2016/0164363 A1* | 6/2016 | Schroeder | ............... | H02K 11/30 |
| | | | | 310/71 |
| 2016/0197531 A1* | 7/2016 | Chiou | ............... | H02K 5/225 |
| | | | | 310/71 |
| 2016/0197538 A1* | 7/2016 | Takamura | ............... | H02K 5/161 |
| | | | | 310/71 |
| 2016/0204670 A1* | 7/2016 | Yamasaki | ............... | H02K 11/215 |
| | | | | 310/71 |
| 2016/0254722 A1* | 9/2016 | Yamamoto | ............... | H02K 3/522 |
| | | | | 310/71 |

OTHER PUBLICATIONS

International Preliminary Report on Patentability and Written Opinion of the International Searching Authority (EPO), dated Apr. 10, 2018, in corresponding international application No. PCT/US2016/056079.

Searching Authority's (EPO) International Search Report and Written Opinion, issued in corresponding international application No. PCT/US2016/056079, dated Dec. 14, 2016.

\* cited by examiner

SEGMENTED BRUSHLESS STATOR INTERCONNECT SYSTEM

CROSS REFERENCE TO RELATED APPLICATIONS

This patent application is filed under 35 U.S.C. § 111(a) and claims the benefit of priority under 35 U.S.C. § 119(e) to U.S. Provisional Patent Application Ser. No. 62/239,370, filed Oct. 9, 2015, which is incorporated by reference herein in its entirety for any purpose whatsoever.

BACKGROUND OF THE INVENTION

1. Field of the Invention

The subject matter disclosed herein relates generally to motor technology and more particularly to an interconnect system and method of assembling a segmented stator of a motor.

2. Description of the Related Art

In brushless rotary motors, the rotor typically includes permanent magnetic material positioned on extended sections referred to as "poles". The stator of the motor may include separate segments (referred to as "teeth"), with each segment being wound with a coil of wire. The coils in the stator segments are energized with current to produce electromagnetic fields. The electromagnetic fields generated in the stator coils interact with the permanent magnets of the rotor to induce torque and rotation of the rotor. By controlling the polarity of the currents generated in the coils of the teeth of the stator, the rotor may be rotated continuously.

The stator may be constructed from the single-tooth laminated segments. Each of the segments may be individually insulated and then wound. The identically wound segments are then typically assembled into a circular shape as a complete armature stator. The assembly may be permanently retained in this circular shape when installed in a motor housing.

Prior to installation in the housing, the assembled stator may be temporarily retained by a mechanical clamp or fixture while electrical interconnections are made. The coil wound around each stator segment typically has a start wire end and a finish wire end (collectively "coil terminals). Depending upon the specific segment's location within the assembled stator, the coil terminals are connected either in series or parallel with another coil, to a neutral lead, or to a power lead.

The wiring of coil terminals is complicated by the fact that in order to produce appropriate motion, the polarities of the electromagnetic fields produced in the stators are alternated in time. The complexity of the wiring in turn affects the way in which the coils are wound onto the stator segments. In general, the wiring of each stator segment is done individually, and not in a uniform, consistent manner. Individual wiring adds to the complexity and cost of ultimate motor product, and also affects performance parameters. In particular, using current interconnect methods, it is difficult to optimize the amount of copper fill, which is the amount of copper positioned in the spaces between the stator segments.

What is needed is a system and method for providing interconnections to the coils of a segmented stator of a brushless motor, that improves assembly efficiency and optimizes copper fill.

SUMMARY OF THE INVENTION

In one embodiment, a stator of an electric motor is provided. The stator includes a plurality of segments, each of the segments including a tooth having magnetically-permeable material, an electric coil surrounding the tooth, and at least one insulator; a plurality of connectors, each connector including first and second terminals, the first terminal adapted to be inserted into the at least one insulator and to couple to the electric coil of each of the plurality of segments; and a circuit board coupled to input power lines and including apertures adapted to receive the second terminals of the plurality of connectors. The circuit board is coupled to the electric coils of each of the plurality of segments when the second terminals are received in the apertures The electrical coils of all of the plurality of segments may be wound in the same direction. The electrical coils of all of the plurality of segments may be bobbin wound. In addition, the second terminals of the plurality of connectors may include a spring element. The spring element may be adapted to compress when inserted to an aperture of the circuit board and provide a firm mechanical and electrical connection between the connector and the circuit board. The circuit board may include circuitry for connecting the input power lines to specific ones of the electrical coils of the plurality of segments to provide commutation. In particular, the circuitry may couple the input power lines to specific ones of the electrical coils of the plurality of segments to commutate a 3-phase motor. The circuit board may be annular in shape. The at least one insulator of the plurality of segments may include a pocket for receiving the first terminals of the plurality of connectors. The first terminals of the plurality of connectors may include prongs adapted to make incisions into and form an electrical connection with the electrical coils of the plurality of segments. The teeth of the plurality of segments of the stator may be composed of laminated sections.

In another embodiment, a method of assembling a motor stator including a plurality of segments, each of the plurality of segments having wound electrical coils, is provided. The method includes spatially arranging the plurality of segments for assembly; coupling first terminals of a plurality of connectors to the plurality of segments, at least one connector being coupled per segment, each connector forming an electrical connection with the electrical coil of the respective segment to which it is coupled; and press fitting a circuit board onto second terminals of the plurality of connectors, the circuit board coupling the electrical coils of the plurality of segments to input power lines through the plurality of connectors.

The method may include winding the electrical coils of all of the plurality of segments in the same direction. For example, the electrical coils may be bobbin-wound. The circuit board may include apertures for receiving the second terminals of the plurality of connectors. The second terminals of the plurality of connectors may include a spring element. The method may further include inserting the first terminals of the plurality of connectors into pockets formed in insulators on the plurality of segments. Incisions may be made in the electrical coils of the plurality of segments by insertion of the first terminals of the plurality of connectors into the pockets of the insulators, the incisions providing an electrical connection between the electrical coils and the plurality of connectors. The circuit board may include circuitry for connecting the input power lines to specific ones of the electrical coils of the plurality of stators to effectuate commutation.

The segmented stator for a brushless DC disclosed herein may be deployed on motors in a wide array of applications and settings. The settings may include any of: food and beverage processing; packaging and converting; pharmaceutical; material forming; medical laboratory and automation; robotics; printing; labeling; aerospace; tire and rubber; postal sorting; automated vehicle; and oil and gas industry.

BRIEF DESCRIPTION OF THE DRAWINGS

The features and advantages of the invention are apparent from the following description taken in conjunction with the accompanying drawings in which.

DETAILED DESCRIPTION OF THE INVENTION

Disclosed herein is a brushless DC (direct current) motor stator and associated method of stator assembly. In the assembly method, individually wound segments of a stator are electrically connected together using a press-fit printed interconnection circuit board ("press-fit PCB") to complete the stator circuit. A particular advantage of the press-fit PCB is that assembly is simplified, resulting in a reduction in labor, time and costs. Use of the press-fit PCB may eliminate the need to solder multiple connections of the stator coil terminals. In addition, quality issues associated with soldering, such as fractured joints or cold joints, are also reduced or eliminated.

Figure 1:
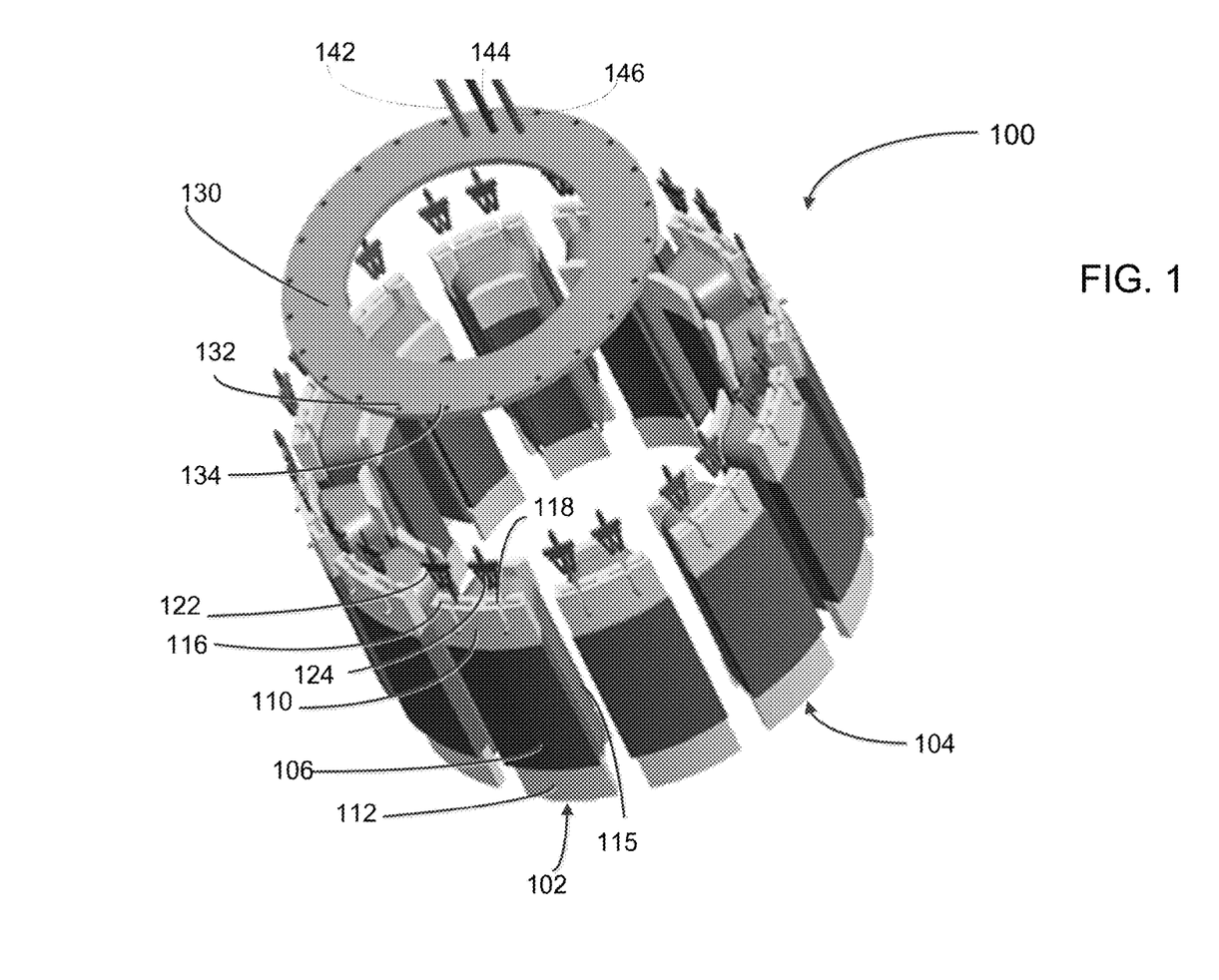
FIG. 1 is an exploded view of an exemplary segmented stator and assembly system according to the teachings herein.

Turning to FIG. 1, an exploded view of a stator 100 and assembly system is shown. The stator 100 includes a plurality of separate segments, such as segment 102 and segment 104. While the exemplary stator 100 shown in FIG. 1 includes twelve segments, other number numbers of segments may be used. For ease of description, the components of each segment will be described with respect to a single segment 102. Segment 102 includes a tooth-shaped element ("tooth") 106 made of a magnetically-permeable material. The tooth 106 may be constructed from laminated sections of material to reduce heat losses. The upper end of tooth 106 is capped with an upper insulator 110 and the lower end of tooth 106 is capped with a lower insulator 112. The insulators 110, 112 may be formed on the tooth 106 by injection molding or similar assembly techniques. Both the upper insulator 110 and lower insulator 112 define recesses that provide space in which a coil of wire 115 may be wrapped around tooth 106. The coil of wire is typically made of wound copper, but other metals, alloys, and conductive materials may be employed or added. Additionally, the upper insulator 110 includes pockets 116 and 118 that are both adapted to receive an insulation displacement connector ("IDC") terminal. Exemplary insulation displacement connectors (IDCs) 122 and 124 are illustrated as suspended over respective pockets 116 and 118 for purposes of illustration. As shown, a first terminal of IDC 122 is adapted to be received in pocket 116 of the upper insulator 110, and a first terminal of IDC 124 is adapted to be received in pocket 118 of the upper insulator 110. A start wire (not shown) of coil 115 is routed to IDC terminal 122 and an end wire (also not shown) of coil 115 is routed to IDC terminal 124.

An annular press-fit interconnection circuit board (hereinafter "press-fit PCB") 130 is shown suspended above the stator 100. The press-fit PCB 130 is designed to correspond to the shape of the stator 100, as assembled, which in the example shown in FIG. 1 is circular. The press-fit PCB 130 includes apertures, for example apertures 132 and 134, that are adapted receive second terminals of IDC 122 and IDC 124. That is, IDC 122 and IDC 124 are coupled at a first terminal to the stator segment 102 and at a second terminal to the press-fit PCB 130, and are thus adapted to interconnect stator segment 102 with press-fit PCB 130. In general, the press-fit PCB 130 includes additional apertures for receiving IDCs coupled to all of the segments of the stator 100. The apertures e.g., 132 and 134, have internal surfaces that include conductive material.

As described in greater detail below, the second terminals of the IDCs such as IDC 122 and IDC 124 may be configured with a compliant spring shape. The press-fit PCB 130 includes internal circuitry that couples the apertures 132 and 134 to input electrical leads 142, 144, 146 that provide electrical power and control signals to the stator 100. It is to be noted that other types of compatible terminals may be used and the press-fit PCB 130 may be modified as needed to conform to the requirements of the terminals and/or to the size and shape of the stator 100.

Figure 2:
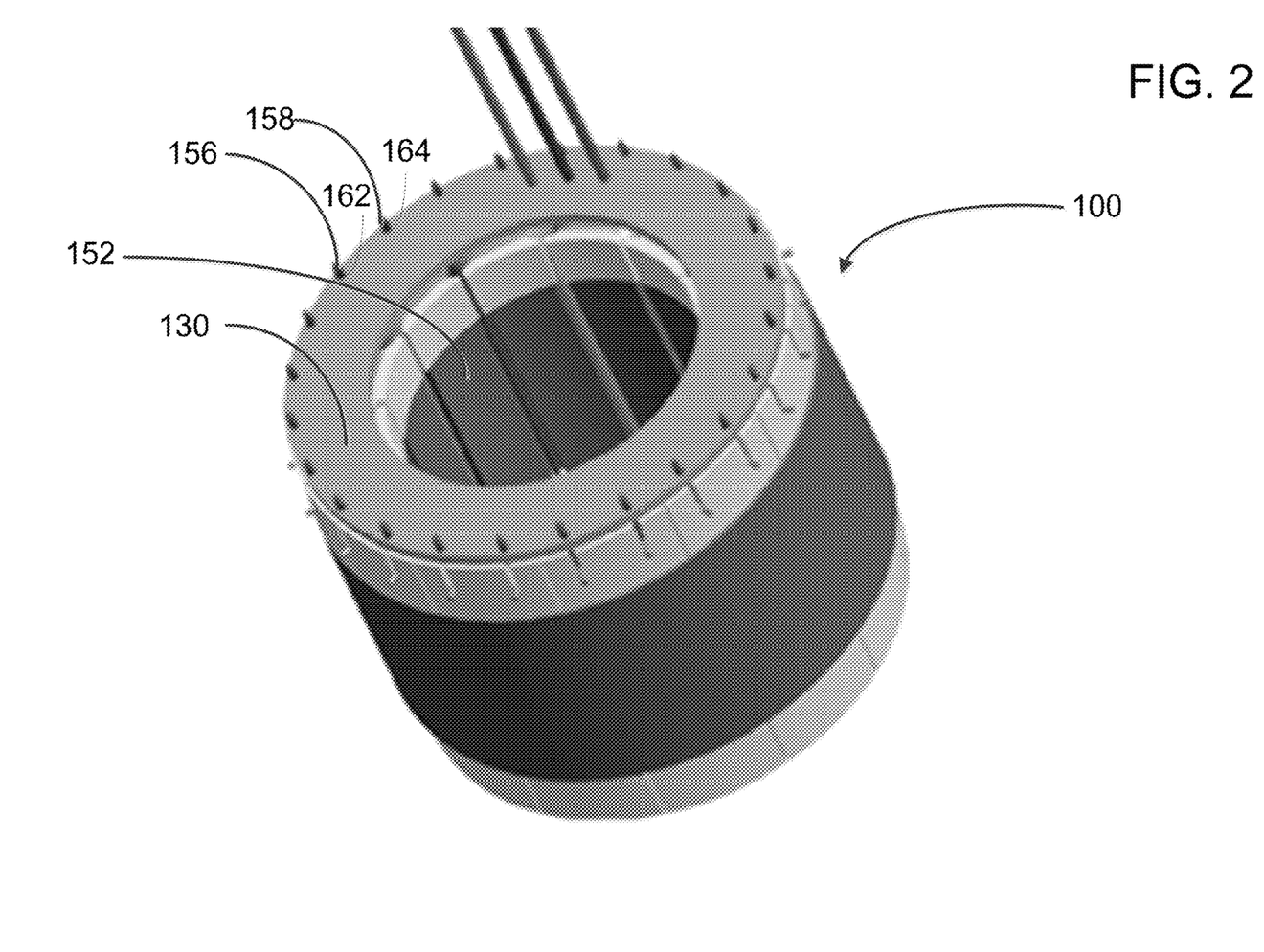
FIG. 2 is a perspective view of a stator in assembled form according to the teachings herein.

FIG. 2 is a perspective view of stator 100 in assembled form. During the process of assembly, the press-fit PCB 130 may be pressed onto the terminals of the insulation displacement connectors (IDCs) in a single action. As shown in FIG. 2, a stator segment 152 includes IDCs having terminals 156 and 158 which extend through respective apertures 162 and 164 of the press-fit PCB 130. As the press-fit PCB 130 is pressed down onto the terminals 156 and 158, terminals 156 and 158 insert into and are compressed laterally by the walls of the apertures 162 and 164. Due to the compression of terminals 156 and 158 within apertures 162 and 164, a firm electrical contact and mechanical retention is formed. By providing firm electrical contact by the combination of the mechanical properties of the terminals 162 and 164 and the press-fit PCB 130, the need for individual soldered contacts may be eliminated. Moreover, installing the press-fit PCB 130 onto the stator segments and IDCs requires less labor time than soldering multiple connections and eliminates quality issues associated with soldering, such as fractured joints or cold joints. The press-fit PCB 130 may be installed either before or after the stator is placed into the housing, as needed.

In addition, removal of the soldered connections simplifies other assembly options. For example, when copper wires are employed, the wires of all the individual stator segments may be "bobbin-wound", which means that coils of all of the segments can be wound in the same direction (in either clockwise or counterclockwise orientation), using the same winding process. Bobbin-winding permits a greater "copper fill" utilization of the space between the stator segments, referred to as the "slot spacing". For a given slot spacing, bobbin winding allows copper wire of larger diameter to be used than would otherwise be feasible. The larger diameter of the wires increases the overall volume of the copper coils in the slot spaces. The increased copper fill, in turn, improves overall motor performance because for a given amount of current or torque, the resistance per turn of coil falls, as does the increase in coil temperature per unit of current. Accordingly, increased copper fill provides reduced coil heating for a given level of motor torque, or conversely, a greater motor torque for a given level of coil heating.

Figure 3:
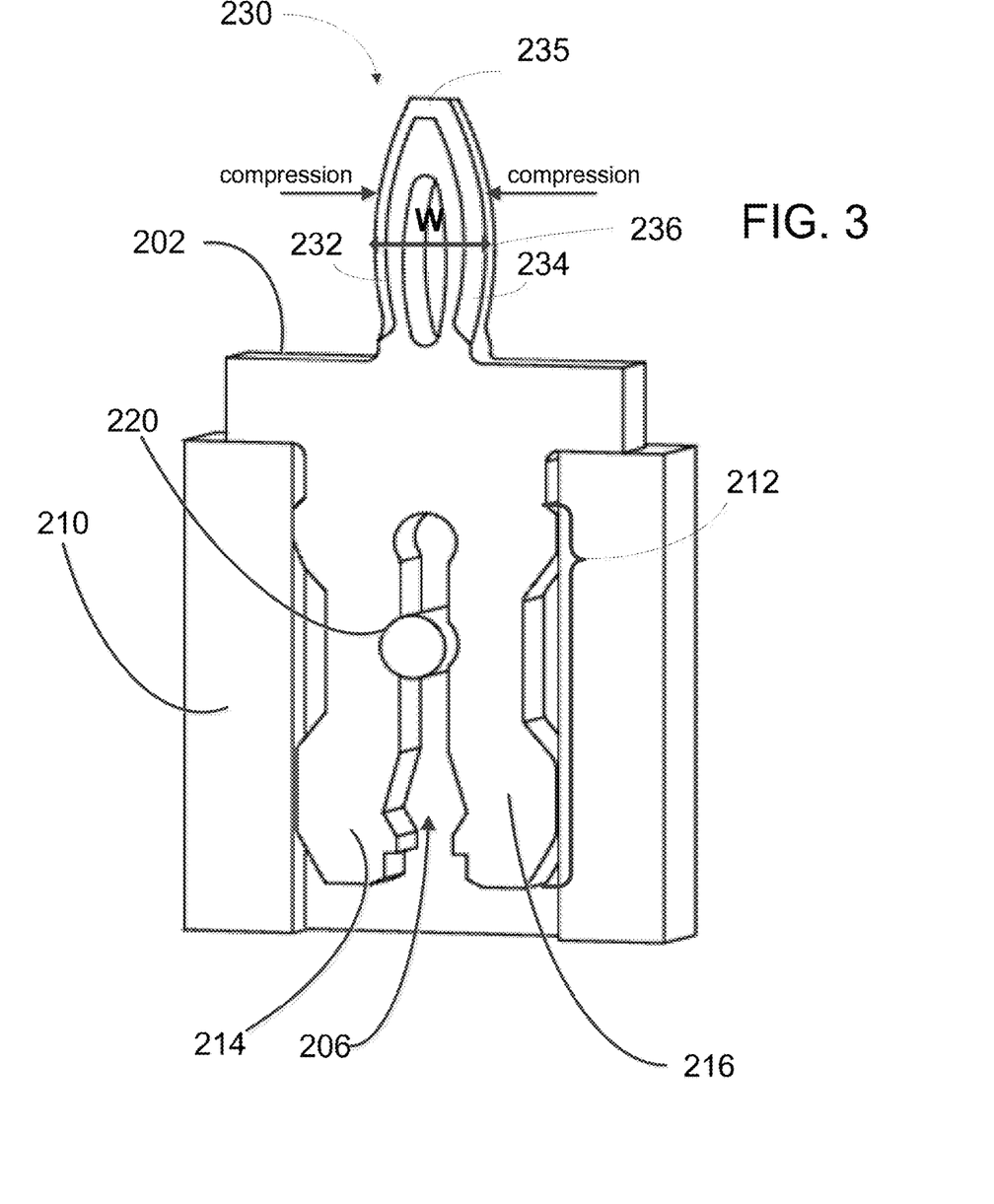
FIG. 3 is a cross-sectional view of an exemplary insulation displacement connector (IDC) inserted into a pocket of an insulator according to the teachings herein.

Turning to FIG. 3, an enlarged cross-sectional view of an interconnect displacement connector (IDC) 202 inserted into a pocket 206 of a stator insulator 210 is shown. A first, bottom terminal 212 of the IDC 202 includes separated prongs 214 and 216 made of or including a conductive material. A terminal (start or finish) of a coil 220 is shown positioned between prongs 214 and 216. The dimensions and finish of the prongs 214 and 216 are designed such that upon insertion of the IDC 202 into pocket 206, edges of prongs 214 and 216 pierce any insulation that may cover the coil terminal 220 and cut for a depth into (incise) the underlying metal (typically copper) of the coil terminal 220. The contact between the prongs 214 and 216 and the underlying metal of coil 220 creates an electrical connection therebetween. The direct electrical connection produced by the piercing action of the prongs 214, 216 eliminates the need for a soldered connection of the terminal 212 to the coil 220. This connection technique is faster, easier to reproduce during assembly and more reliable than soldering. Insertion of terminal 212 into the pocket 206 and trimming off of any excess wire ends may be automated in an assembly process.

IDC 202 also includes a second, top terminal 230 adapted to be inserted into an aperture of a press-fit PCB. The terminal 230 may be configured as shown in a spear-point shape including two flexible, spring-like arms 232 and 234 which are compressible inwardly in the directions shown in FIG. 3. The width of the terminal 230 is narrow at a top portion 235 (the "point" of the terminal) and increases to a maximal value (W) at or near a mid-section 236 of the terminal 230.

Figure 4A:
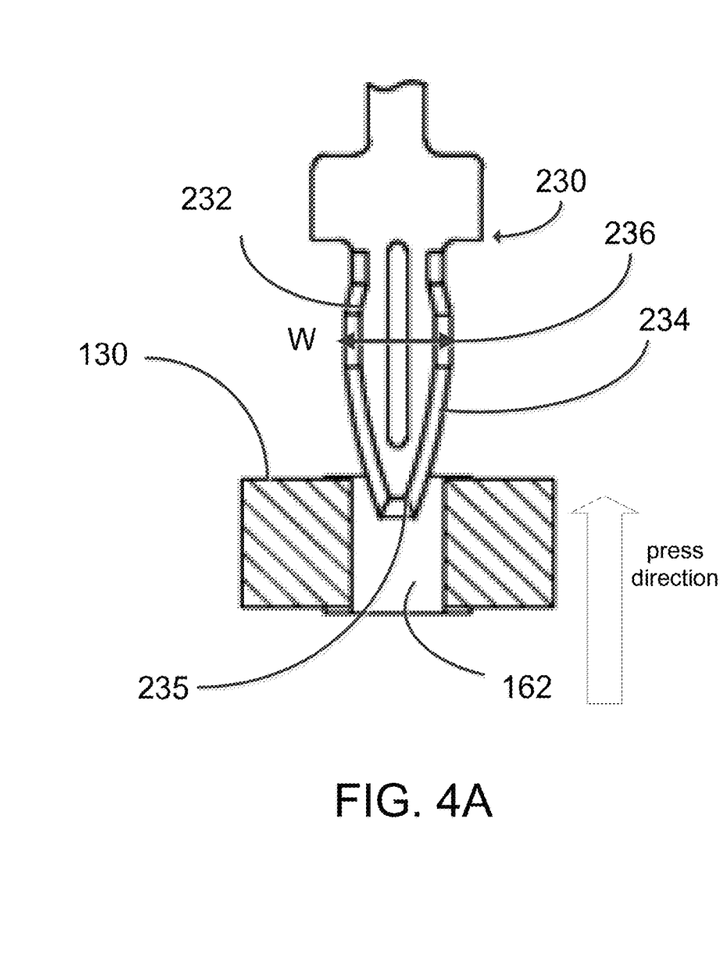
FIG. 4A is a cross-sectional view of an IDC terminal and an aperture of a press-fit PCB prior to insertion of the terminal into the aperture according to the teachings herein.
Figure 4B:
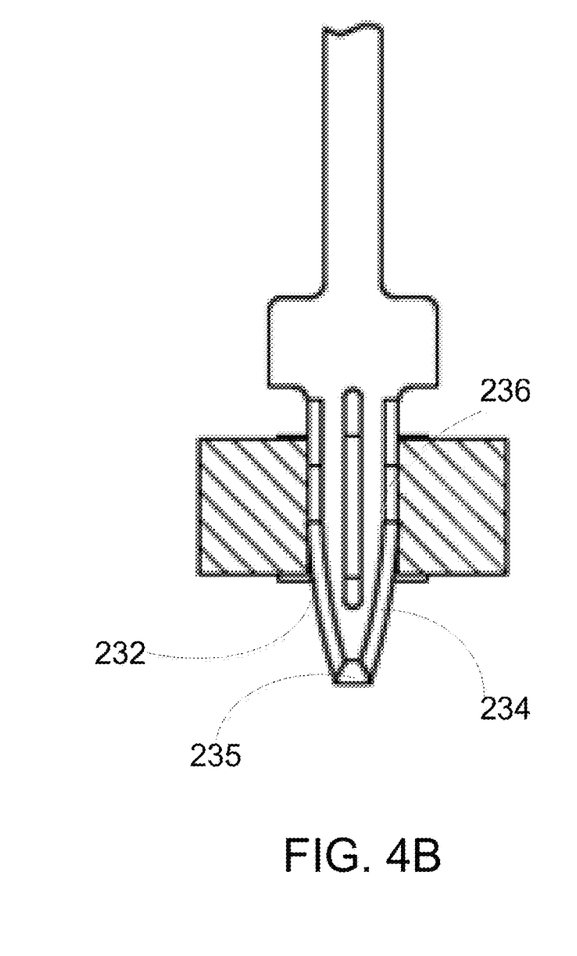
FIG. 4B is a cross-sectional view of an IDC terminal and an aperture of a press-fit PCB after insertion of the terminal into the aperture according to the teachings herein.

FIGS. 4A and 4B are cross-sectional views illustrate a process of press-fitting an aperture 162 of press-fit PCB 130 over a top terminal 230 of an IDC according to the teachings herein. In FIG. 4A the aperture 162 is shown aligned over the point 235 of terminal 230 with the press-fit PCB 130 intended to be moved in the direction shown, and pressed onto the IDC terminal 230. It is noted that the upward pressing direction shown is merely exemplary and in various implementations the directional relationship between the press-fit PCB 130 and the IDC terminal 230 (coupled to the stator) may be opposite to that shown (PCB pressed downwards), horizontal, or oriented at angles to the vertical or horizontal. As the PCB 130 is pressed onto the terminal, and the point 230 enters a certain depth into the aperture 162, the varying width of the terminal comes into play. As the width (W) of mid-section 236 is designed to be slightly greater than the diameter of aperture 162, the mid-section 236 cannot fit into the aperture without deforming. In response to the pressure exerted by the PCB 130 as it is pressed upon the terminal 230, the spring-like arms 232 and 234 compress inwardly to fit within the aperture 162. FIG. 4B shows the IDC terminal 230 inserted into the aperture 162 after the press-fit PCB 130 has been pressed and installed over the IDC 230. In the position shown in FIG. 4B, the terminal 230 is nearly fully inserted into the barrel of aperture 162. The compression of arms 232 and 234 provides a firm mechanical contact between the arms and the internal surface of the aperture 162. In addition, as the internal surface of the aperture includes electrical contacts as well, a firm electrical coupling is formed between the terminal 230 and press-fit PCB 130. As shown in FIG. 4B, the point 235 of the terminal may emerge from the aperture 162 on the opposite side of the press-fit PCB 130.

Figure 5:
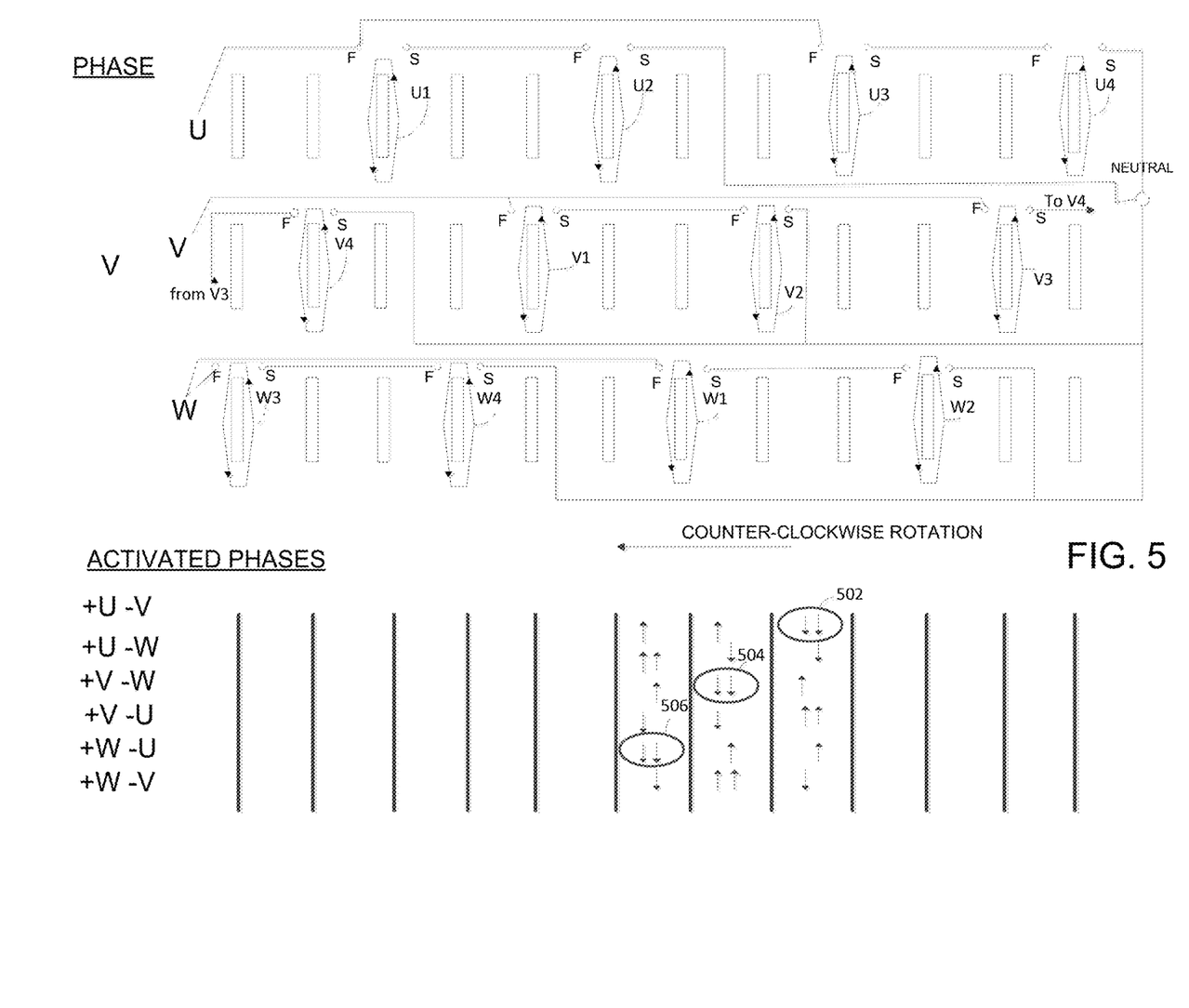
FIG. 5 is a schematic diagram illustrating the segments of a stator and an exemplary electrical circuit of the press-fit PCB according to the teachings herein.

FIG. 5 is a schematic diagram illustrating the segments of a stator, viewed as aligned linearly, and an exemplary electrical circuit of the press-fit PCB for connecting input power lines to the coils of the stator segments. In the example shown in FIG. 5, the circuit is configured for energizing the coils of stator segments to induce a counter-clockwise rotation of the rotor. In brushless DC motors, the input power lines supply signals at staggered phases, which energize the coils of the stator segments in a rotating pattern. The energized coils generate electromagnetic poles that interact with the permanent magnets of the rotor, and thereby induce torque on the rotor. In the example shown in FIG. 5, the stator includes twelve stator teeth, with each tooth having a surrounding coil. The twelve coils are numbered in three groups, U1, U2, U3 and U4, V1, V2, V3 and V4, and W1, W2, W3 and W4. All of the twelve coils U1-U4, V1-V4 and W1-W4 may bobbin-wound in the same direction. Each coil U1-U4, V1-V4, W1-W4 includes a first terminal (denoted S for "Start") and a second terminal (denoted F for "Finish"). Input power lines, denoted U, V, and W, are coupled to the S and F terminals of the segment coils in a specific pattern as determined by the interconnections with the press-fit PCB. Lines U, V and W provide a three-phase supply in which the signals transmitted on U, V and W, are mutually 120 degrees apart in phase. The pattern of activation of the coils is adapted to generate eight electromagnetic poles in the stator.

The press-fit PCB includes circuitry for coupling the input lines U, V and W to the coils U1-U4, V1-V4 and W1-W4 in such manner as to enable commutation, which is the changing of current direction and swapping of voltage inputs that enables continuous torque to be generated on the rotor. As shown in FIG. 5, wire U is coupled to the F terminal of coil U1, and the F terminal of coil U3. The S terminal of U1 is coupled to the F terminal of U2, and the S terminal of U3 is coupled to the F terminal of U4. The S terminal of U2 and the S terminal of U4 are coupled to a neutral reference voltage. The V wire is coupled to the F terminal of V1 and the F terminal of V3. The S terminal of V1 is coupled to the F terminal of V2, and the S terminal of V3 is coupled to the F terminal of V4. The S terminals of V2 and V4 are coupled to the neutral reference. Similarly, the W wire is coupled to the F terminal of W1 and the F terminal of W3. The S terminal of W1 is coupled to the F terminal of W2, and the S terminal of W3 is coupled to the F terminal of W4. The S terminals of W2 and W4 are coupled to the neutral reference.

It is noted that the coils U1-U4, V1-V4, W1-W4 do not correspond to specific stator segments or coils. In implementations in which all of the stator coils are bobbin-wound similarly, all of the coils "appear" to be equivalent with respect to the press-fit PCB. It is the circuitry of the press-fit PCB and the connections to the input wires which create the differences and relationships between the coils of the stator.

The bottom of FIG. 5 illustrates the activation of positive and negative voltages on pairs of wires U, V and W and the corresponding activation of coils U3, V2 and W1 of the stator. As shown, in operation, when a positive voltage is asserted on wire U and a negative voltage is asserted on wire V (with W kept neutral), a large counter-clockwise current represented by two circled downward arrows 502 is supplied to coil U3. The same current is also supplied to coils U1, U2 and U4 that are positioned three slots away from U3 (i.e., three slots corresponds to 360 degrees, with immediately adjacent slots being 120 degrees apart). The energized coils U1, U2, U3 and U4 induce torque on the permanent magnets of the rotor. As the rotor rotates, torque on the rotor is maintained by commutation. When wire U is de-asserted and switched to neutral (a 120 degrees shift of the 3-phase motor), a positive voltage is asserted on wire V and a negative voltage is asserted on Wire W, a large counter-clockwise current 504 is supplied to coils V1, V2, V3 and V4 which are adjacent to coils U1, U2, U3, and U4. Similarly, after another 120 degree phase shift, when wire V is de-asserted and switched to neutral, a positive voltage is asserted on wire W and a negative voltage is asserted on wire U, a large counter-clockwise current 506 is asserted 506 is supplied to coils W1, W2, W3 and W4. In FIG. 5 it can be seen, for example, that coil V2 is adjacent to the left of coil U1, and that coil W1 is adjacent to the left of coil V2. Thus, by activating the U coils, the V coils and the W coils in succession, the pattern of activation of the coils goes from right to left and follows the direction of rotation of the rotor. In this manner, a continuous torque may be applied to the rotor as the activation of the electromagnetic poles is kept in synch with the pattern of permanent magnet poles of the rotating rotor.

Figure 6A:
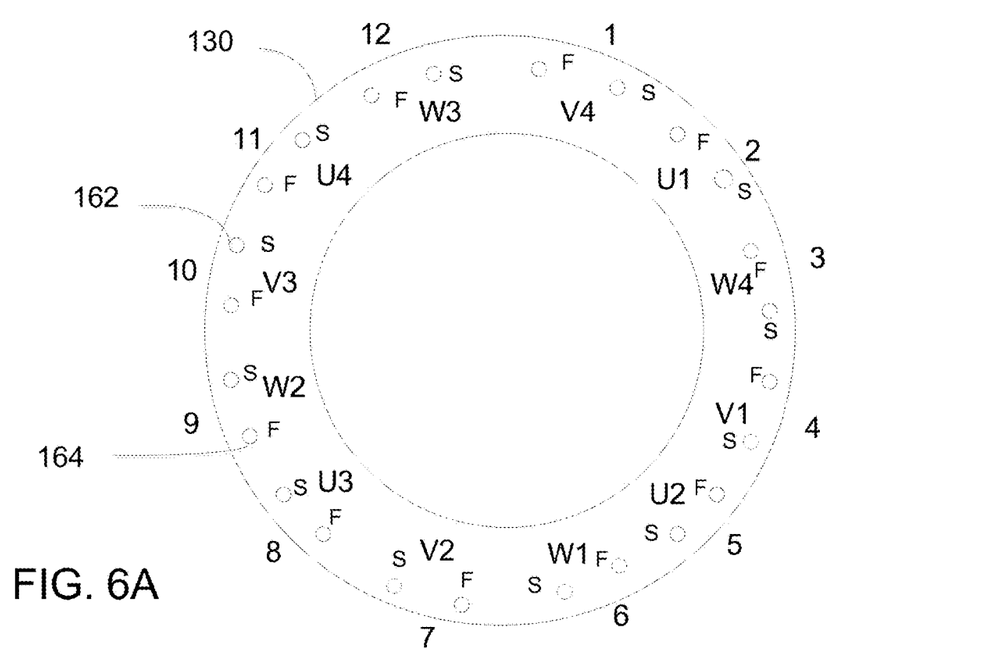
FIG. 6A is a top view of the press-fit PCB 130 illustrating an example configuration of electrical connections to the apertures according to the teachings herein.
Figure 6B:
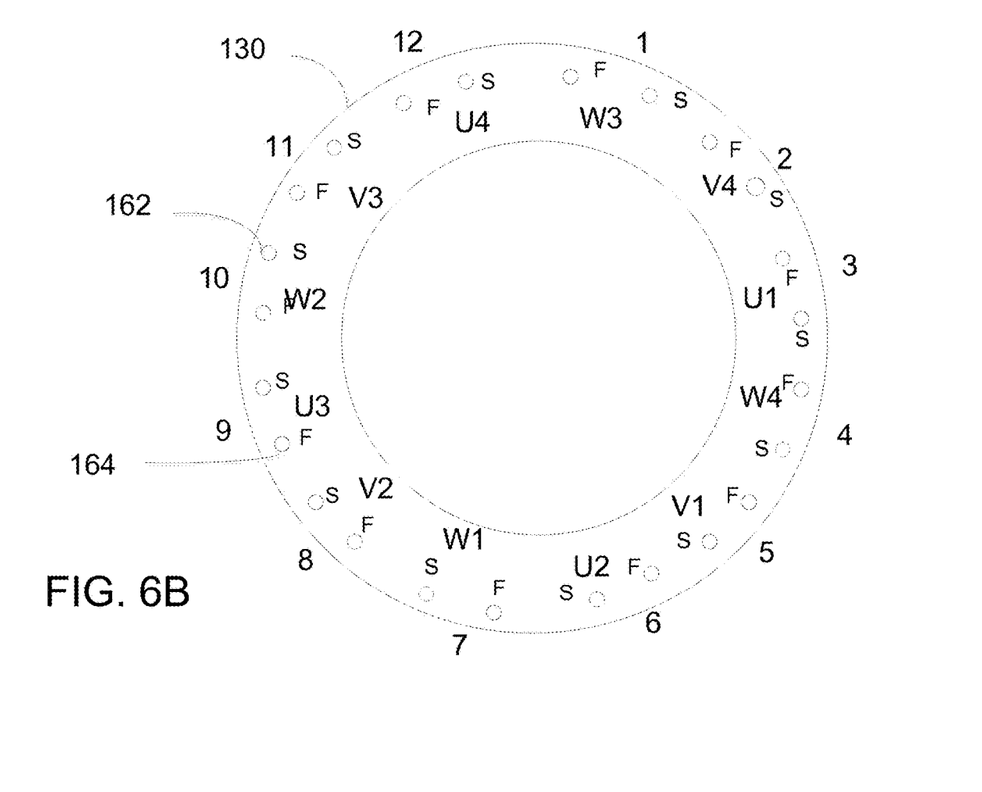
FIG. 6B is a top view of the press-fit PCB 130 illustrating the press-fit PCB of FIG. 6A positioned in a different orientation from that shown in FIG. 6A.

FIG. 6A is a top view of the press-fit PCB 130 illustrating an example configuration of electrical connections to the apertures according to the teachings herein. Each aperture e.g., 162 and 164 is adapted to couple to either a start or finish terminal of a stator coil. Outside of the press-fit PCB 130 a series of numbers 1 through 12 are intended to indicate physical reference positions. For example 1 may correspond approximately to NNE, and V2 may correspond approximately to SSW. When the press-fit PCB is installed on the stator of a motor such that the press-fit PCB is oriented in the manner shown, then the coil in position 1 is activated as coil V4, the coil in position 2 is activated as coil U1, the coil in position 3 is activated as coil W4, the coil in position 4 will be activated as coil V1, and so on. However, as shown in FIG. 6B, if the press-fit PCB 130 is installed in a different orientation, the absolute position of the various coils changes, but the relative positions of the coils (as activated) do not change. That is, comparison of FIGS. 6A and 6B shows that, for instance, while coil V4 has moved from position 1 (FIG. 6A) to position 2 (FIG. 6B), coil U1 is still adjacent to V4 in a clockwise direction, and coil W3 is still adjacent to V4 in a counter-clockwise direction. In other words, the relationship between the coils, and the manner in which the coils are activated by the input wires, remains the same in any absolute orientation of the press-fit PCB 130 with respect to the stator.

Figure 7:
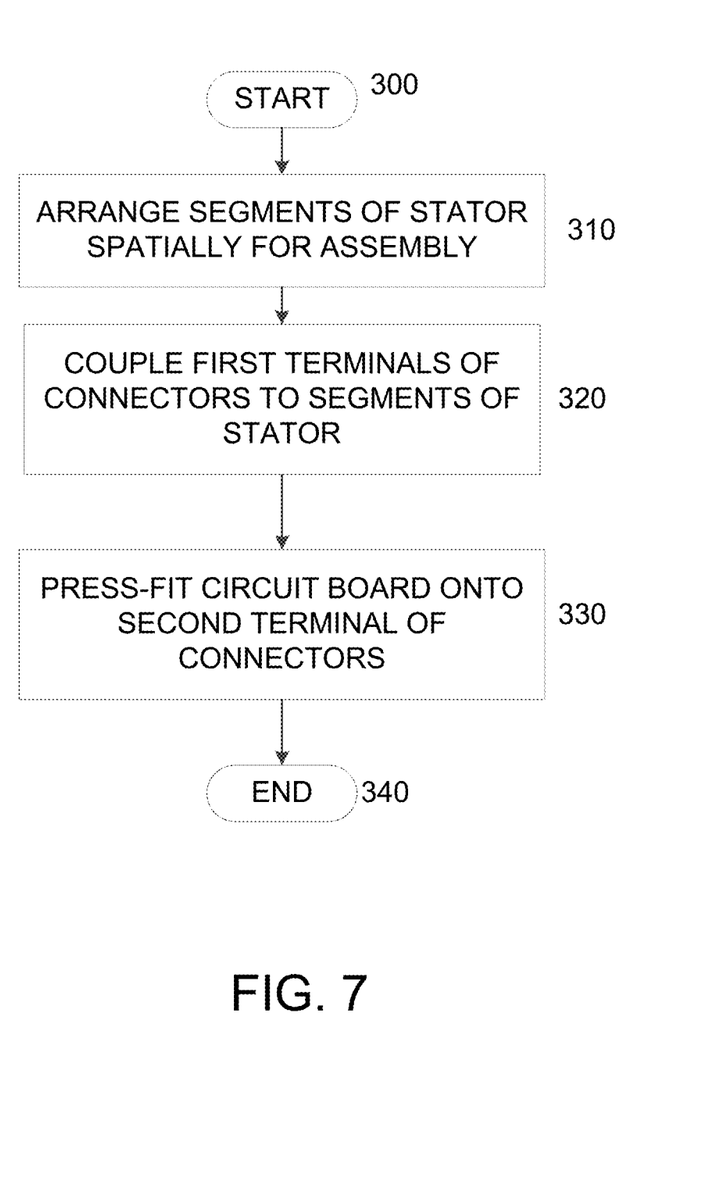
FIG. 7 is a flow chart of a method of assembling a segmented motor according to the teachings herein.

Referring to FIG. 7. a flow chart of a method of assembling a segmented motor is shown. In first step 300, the method begins. In a second step 310, the segments of a segmented stator are arranged together spatially for assembly (e.g., in a circle). In step 320, the first terminals of connectors, such as IDCs are coupled to each of the stator segments, respectively. The first IDCs terminals form an electrical connection with the coils of each stator segments. In step 330, a circuit board is press fit onto second terminals of the connectors; the second terminals are fitted into apertures of the circuit board. The circuit board is coupled to the coils of the segment stators via the connectors. In step 340 the method ends.

Having thus introduced aspects of the invention, some additional features, embodiments and considerations are now set forth.

The teaching herein are intended to apply to any brushless DC stator of any number of segments. Moreover, while an exemplary embodiment herein is a 3-phase implementation, the teachings herein apply equally to other phase number implementations, such as a 4-phase motor.

It should be noted that some of the terminology set forth herein may be in agreement, or only partially an agreement with terminology set forth in the prior related provisional patent application. One skilled in the art will recognize the various uses of terms and be able to make the distinctions. However, if a conflict should exist, terminology is set forth in this disclosure shall prevail. It should be recognized that some adjustment and terminology has been provided to simplify explanation. No conflicts in terminology should be construed or inferred.

Terms of orientation are used herein merely for purposes of convention and referencing, and are not to be construed as limiting.

Standards for performance, materials, assembly or other such parameters are to be judged by a designer, manufacturer, user, owner, operator or other similarly interested party. No particular requirements for any standards are implied or to be inferred by the disclosure here.

All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Various other components may be included and called upon for providing for aspects of the teachings herein. For example, additional materials, combinations of materials and/or omission of materials may be used to provide for added embodiments that are within the scope of the teachings herein.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements. The usage of the term "exemplary" is to be construed as meaning one of many possible embodiments. The term "exemplary" is not to be construed as being necessarily indicative of a superior or superlative embodiment, although, in some instances this may be the case.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A stator of an electric motor comprising:
a plurality of segments, each of the segments including a tooth having magnetically-permeable material, an electric coil surrounding the tooth, and at least one insulator;
a plurality of connectors, each connector including a first terminal providing two arms adapted to pierce an insulation covering of an electrical wire and electrically connect therewith, and a second terminal providing an elongate element, wherein the first and second terminals are integrally formed from a conductive material; and
a circuit board coupled to input power lines and including apertures adapted to receive the second terminals of the plurality of connectors by compression fit;
wherein the circuit board is coupled to the electric coils of each of the plurality of segments when the second terminals are received in the apertures.

2. The stator of claim 1, wherein the tooth of each of the plurality of segments is composed of laminated sections.

3. The stator of claim 1, wherein the electrical coils of all of the plurality of segments are wound in the same direction.

4. The stator of claim 3, wherein the electrical coils of all of the plurality of segments are bobbin wound.

5. The stator of claim 1, wherein the second terminals of the plurality of connectors include a spring element.

6. The stator of claim 5, wherein the spring element is adapted to compress when inserted to an aperture of the circuit board and provide a firm mechanical and electrical connection between the connector and the circuit board.

7. The stator of claim 1, wherein the circuit board includes circuitry for connecting the input power lines to specific ones of the electrical coils of the plurality of segments to provide commutation.

8. The stator of claim 7, wherein the circuitry couples the input power lines to specific ones of the electrical coils of the plurality of segments to commutate a 3-phase motor.

9. The stator of claim 1, wherein the circuit board is annular in shape.

10. The stator of claim 1, wherein the at least one insulator of the plurality of segments includes a pocket for receiving the first terminals of the plurality of connectors.

11. The stator of claim 1, wherein the first terminals of the plurality of connectors include prongs adapted to make incisions into and form an electrical connection with the electrical coils of the plurality of segments.

12. A method of assembling a motor stator including a plurality of segments, each of the plurality of segments having wound electrical coils, the method comprising:
spatially arranging the plurality of segments for assembly;
coupling a plurality of connectors to the plurality of segments, at least one connector being coupled per segment, each of the plurality of connectors comprising a first terminal providing two arms adapted to pierce an insulation covering of the electrical coil and electrically connect therewith, and a second terminal providing an elongate element, wherein the first and second terminals are integrally formed from a conductive material; and
press fitting a circuit board onto the second terminals of the plurality of connectors, the circuit board coupling the electrical coils of the plurality of segments to input power lines through the plurality of connectors.

13. The method of claim 12, further comprising:
winding the electrical coils of all of the plurality of segments in the same direction.

14. The method of claim 13, wherein the electrical coils are bobbin-wound.

15. The method of claim 12, wherein the circuit board includes apertures for receiving the second terminals of the plurality of connectors.

16. The method of claim 15, wherein the second terminals of the plurality of connectors include a spring element.

17. The method of claim 12, further comprising:
inserting the first terminals of the plurality of connectors into pockets formed in insulators on the plurality of segments.

18. The method of claim 17, wherein incisions are made in the electrical coils of the plurality of segments by insertion of the first terminals of the plurality of connectors into the pockets of the insulators, the incisions providing an electrical connection between the electrical coils and the plurality of connectors.

19. The method of claim 12, wherein the circuit board includes circuitry for connecting the input power lines to specific ones of the electrical coils of the plurality of stators to provide commutation.

20. The method of claim 12, wherein plurality of segments of the stator are composed of laminated sections.

21. An electrical connector, comprising:
a first terminal providing two arms adapted to pierce an insulation covering of an electrical wire and electrically connect therewith; and
a second terminal providing an elongate element providing a compression fit with an electrically conductive receptacle;
wherein the first and second terminals are integrally formed from a conductive material.

22. The electrical connector of claim 21, wherein the second terminal is adapted to be inserted into an insulator, wherein the insulator comprises an aperture adapted to support the electrical wire.

* * * * *